US00RE35470E

United States Patent [19]

Jones

[11] E Patent Number: Re. 35,470

[45] **Reissued Date of Patent: *Mar. 4, 1997**

[54] INCLINE PRESS EXERCISE MACHINE

[75] Inventor: Gary A. Jones, Falmouth, Ky.

[73] Assignee: Hammer Strength Corporation, Cincinnati, Ohio

[ * ] Notice: The term of this patent shall not extend beyond the expiration date of Pat. No. 5,044,631.

[21] Appl. No.: 293,884

[22] Filed: Aug. 19, 1994

Related U.S. Patent Documents

Reissue of:

[64] Patent No.: 5,181,896
Issued: Jan. 26, 1993
Appl. No.: 720,411
Filed: Jun. 25, 1991

[51] Int. Cl.[6] ..... A63B 21/08

[52] U.S. Cl. ..... 482/97; 482/92; 482/100

[58] Field of Search ..... 482/100, 92, 93, 482/94, 133, 137, 111, 126

[56] References Cited

U.S. PATENT DOCUMENTS 4,964,632 10/1990 Rochwell .

5,044,631 9/1991 Jones ..... 482/97

*Primary Examiner*—Jerome Donnolly
*Attorney, Agent, or Firm*—Wood, Herron & Evans, P.L.L.

[57] ABSTRACT

An exercise machine for performing an incline press includes a frame, a declined seat connected to the frame along a vertical midplane and two independently maneuverable levers with upper rearward ends pivotally connected to the frame above the seat, on opposite sides of the midplane. The lower, forward ends of the levers are adapted to hold removable weights. Handles also extend inwardly, rearwardly and upwardly from the lower ends of the levers. Each handle is adapted to be grasped by a person supported on the seat and upwardly extended and adducted in an incline press motion against the held weights to move the respective lever along a vertical plane that converges inwardly with respect to the vertical midplane. This incline press exercise machine accommodates the natural musculoskeletal movements of the arms and shoulders of a person, thereby maximizing muscular benefit while minimizing joint stress.

21 Claims, 4 Drawing Sheets

INCLINE PRESS EXERCISE MACHINE

Matter enclosed in heavy brackets [ ] appears in the original patent but forms no part of this reissue specification; matter printed in italics indicates the additions made by reissue.

FIELD OF THE INVENTION

This invention relates to an incline press exercise machine that accommodates the natural musculoskeletal makeup of a person.

BACKGROUND OF THE INVENTION

Many athletes and non-athletes utilize weight lifting or weight training exercises to build strength and/or bulk, to prevent injury, or to improve overall condition and appearance. Typically, weight training exercises are performed with either exercise machines or free weights, i.e., barbells and weighted plates, dumbbells, etc. For various reasons, most exercise programs incorporate both machines and free weights in a variety of different exercise routines in order to maximize the effect of working out a desired number of muscle groups.

Free weights offer a number of advantages over exercise machines. For instance, they are relatively inexpensive in comparison to exercise machines. Free weights are also more versatile because a variety of exercises can be performed with one set of weights, whereas most exercise machines are designed for only one exercise. Even though some exercise machines accommodate more than one exercise, the cost of these machines usually increases proportionately with the number of exercises. Use of dumbbells also enables both arms to be exercised independently. Finally, free weights are popular among many weight lifters because the lifting movements are not restricted to prescribed planes of motion or prescribed angles.

Nevertheless, there are also a number of inherent disadvantages associated with free weights. One such disadvantage relates to safety. Although most weight room instructors strongly advise against an individual working out by himself or herself, this cautionary measure is particularly important when the lifting of free weights is involved. This is due to commonly recognized dangers such as the possibility of dropping a weight on a body part, or becoming trapped beneath a bar, which could easily occur in exercises such as bench press, incline press or squat. Additionally, through carelessness, loading and unloading of heavy weighted plates onto the ends of a bar sometimes results in an unbalanced bar that falls downward from its rack.

Another disadvantage associated with free weights relates to the fact that the weight resistance, or opposing force, that is exercised against is always directed vertically downward by gravity. Yet, the moment arm of the weight about the pivot point varies considerably throughout the full range of motion. This principle is explained in U.S. Pat. No. 3,998,454 with respect to a commonly performed exercise referred to as the dumbbell bicep curl. In short, doing this exercise the applied moment arm about the elbow varies according to the sine of the angle of the lower arm with respect to the vertically oriented upper arm. The moment arm is greatest when the angle is 90°, and it is lowest when the angle is 180° and 0°.

If the resistance capabilities of the muscles of the human body matched this moment arm, the degree of difficulty experienced by the exerciser would be uniform, or balanced, throughout the entire range of motion. However, as reported in U.S. Pat. No. 3,998,454, the strength generated by the human muscles during this exercise is not in fact "balanced" throughout the range of motion, and there are some "sticking points" of increased difficulty. As a result, maximum benefits are not achieved when performing a bicep curl with a dumbbell.

A pullover machine disclosed in U.S. Pat. No. 3,998,454 utilizes an eccentric cam to vary weight resistance over the range of motion for the muscles utilized in a pullover maneuver. Over the years, for various muscle groups, a number of these cam and chain machines have been designed in an attempt to match a resistance variation through a range of motion with the natural strength curve for a particular muscle group associated with the range of motion. To the extent that these machines actually do succeed in approximating a resistance variation to an appropriate strength curve, an improvement over lifting of free weights probably has been achieved.

As a result, applicant has recognized that a machine, rather than free weights, must be employed to advance the state of the art with respect to manipulating resistance variation to match a strength curve for a particular range of motion. Nevertheless, there are a number of practical disadvantages associated with cam and chain machines. These disadvantages are outlined in applicant's copending applications, entitled "Pulldown Exercise Machine" and "Dumbbell Press Exercise Machine," filed on Apr. 26, 1990, Ser. Nos. 07/514,869 and 07/514,839. Moreover, applicant is unaware of any incline press exercise machine that effectively and safely exercises the triceps, the pectoral muscles and the deltoids.

It is therefore an object of the invention to provide an incline press exercise machine that maximizes the exercise benefit attainable during an incline press maneuver while minimizing skeletal or joint stress associated therewith.

It is another object of the invention to provide an incline press exercise machine which combines the advantageous features of both free weight exercise and exercise machines without incorporating the attendant disadvantages normally associated therewith.

It is still another object of the invention to provide an incline press exercise machine which is particularly suitable for exercising one arm at a time.

SUMMARY OF THE INVENTION

This invention contemplates an incline press exercise machine that includes a frame which supports a declined seat straddling a vertical midplane and two levers with upper ends that pivotally connect to the frame above the seat on opposite sides of the mid-plane. Lower ends of the levers are adapted to hold removable weights, and the lower ends further include handles adapted to be grasped by a person declined on the seat. In this position, the exerciser upwardly extends and adducts the arms against the resistance of the supported weights to move the levers through outer vertical planes which converge with respect to the forward facing direction of the seat. This movement advantageously exercises the pectoral, triceps, and the deltoid muscles. This incline press exercise machine facilitates safe and efficient performance of an incline press exercise because it accommodates the natural musculoskeletal makeup of the human body, while at the same time maximizing the muscular benefits attainable during this exercise movement.

More particularly, the natural musculoskeletal makeup of the body is accommodated by the structural orientation of the levers, the lever axes and the handles connected to the levers. The particular combination of all of these structural aspects results in a machine which, based upon feedback from a number of individuals involved in the field of strength training, more naturally couples the muscular exertion of the incline press motion against a preselected weight resistance and in a direction of motion that is compatible with the musculoskeletal structural makeup of the body.

Because it has two independently pivotal levers, this incline press machine enables the performance of either simultaneous or alternate exercise of both arms. This feature is particularly advantageous in monitoring rehabilitation progress after an injury, where it is often necessary to compare the relative strengths of the arms.

In accordance with a preferred embodiment of the invention, an incline press exercise machine includes a frame, a declined seat connected to the frame and two levers having upper, rearward ends pivotally connected to the frame. Lower, forward ends of the levers include hubs for holding weighted plates. The lower forward ends also include handles that extend rearwardly toward the seat and slightly upwardly, thereby to provide a natural grasping position for coupling an applied, incline press force to two outer converging vertical planes of lever motion. That is, the levers pivot along outer vertical planes which converge forwardly with respect to the forward facing direction of the seat, or forwardly with respect to the vertical midplane that bisects the seat.

These outer vertical planes naturally accommodate the structure of the human body relative to the pressing motion utilized in an incline press. As a result, a person supported on the seat is able to maximize the muscular benefits attainable by performing an incline press exercise, while minimizing joint stress. Use of this invention provides exercise for a muscle group that includes the pectoral, triceps and deltoid muscles, and it does so in a manner that does not stress joints or skeletal structure associated with this muscle group.

The structural orientation of this incline press exercise machine evolved from applicant's belief that most exercise machines oversimplify the musculoskeletal movements of the human body. While his accumulated years of observing and analyzing athletic movements of the body led him to conclude that most musculoskeletal movements are rather complex and involve multiple joints and multiple degrees of freedom, he also recognized that most exercise machines require bodily movement in directions or planes that are oriented simply at right angles or parallel to the torso of the body. Based on these observations, and bolstered by his opinion that the ultimate objective of any exercise machine is to provide maximum muscular benefit with minimum joint stress, applicant perceived a need for improvement in the design of exercise machines and began working toward that goal. Feedback from athletes who have used this inventive incline press exercise machine has confirmed that it constitutes a marked improvement over preexisting machines or free weight methods for performing an incline press.

This incline press machine provides the benefits of both free weight exercise and exercise with weight machines, while avoiding the attendant disadvantages commonly associated with each of these methods of exercising.

With this machine, for persons of average size, the moment arm about the pivot point is lowest upon initiation of the upward extension and adduction motion, and the moment arm increases gradually throughout the motion until the lever is parallel with the ground. For other persons, or those with longer arms, the moment arm about the pivot point begins decreasing again from the maximum value as lower end of the lever is rotated above the parallel position.

These and other features of the invention will be more readily understood in view of the following detailed description and the drawings in which:

DETAILED DESCRIPTION OF THE DRAWINGS

Figure 1:
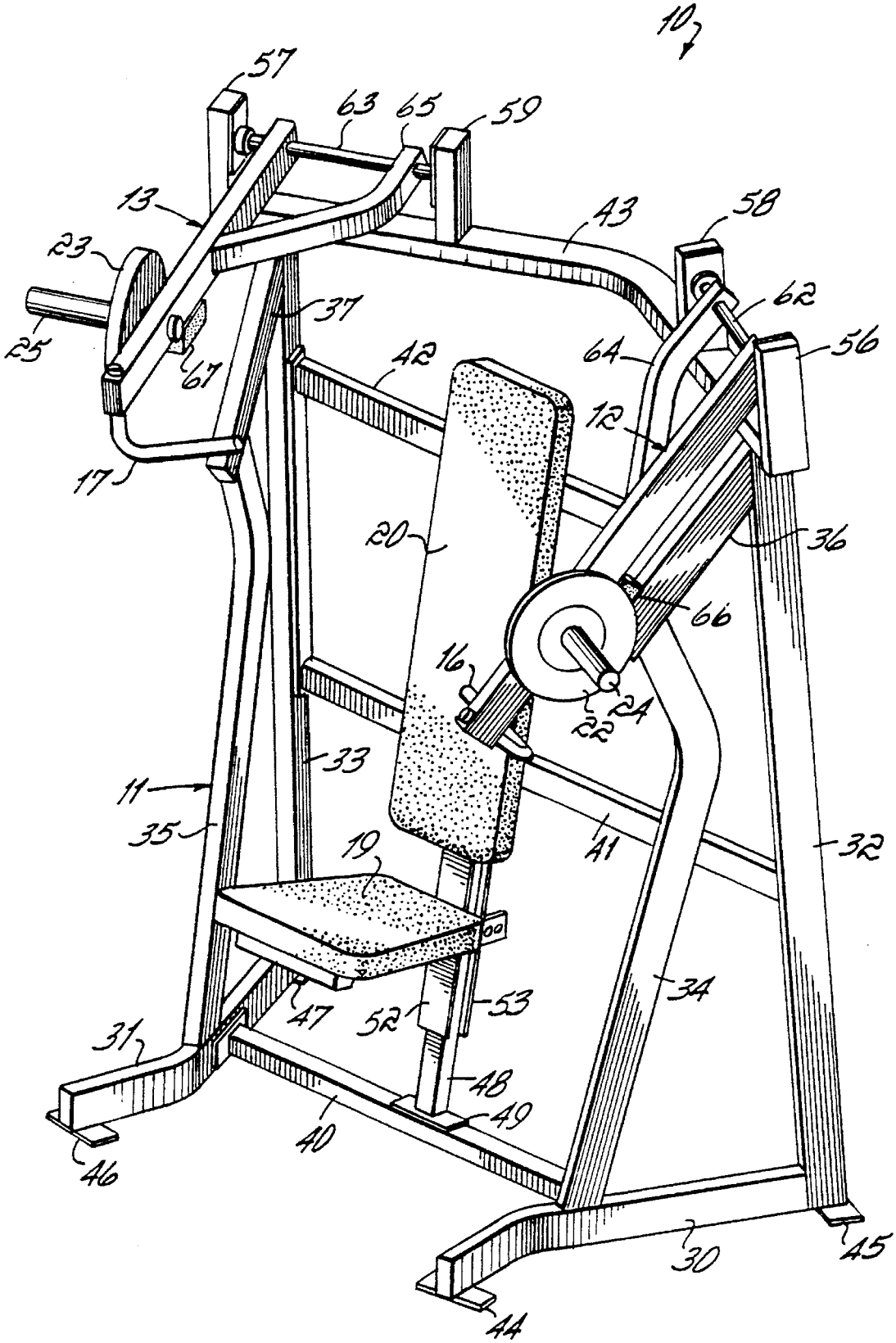
FIG. 1 is a perspective view of an incline press exercise machine in accordance with a preferred embodiment of the invention.
Figure 2:
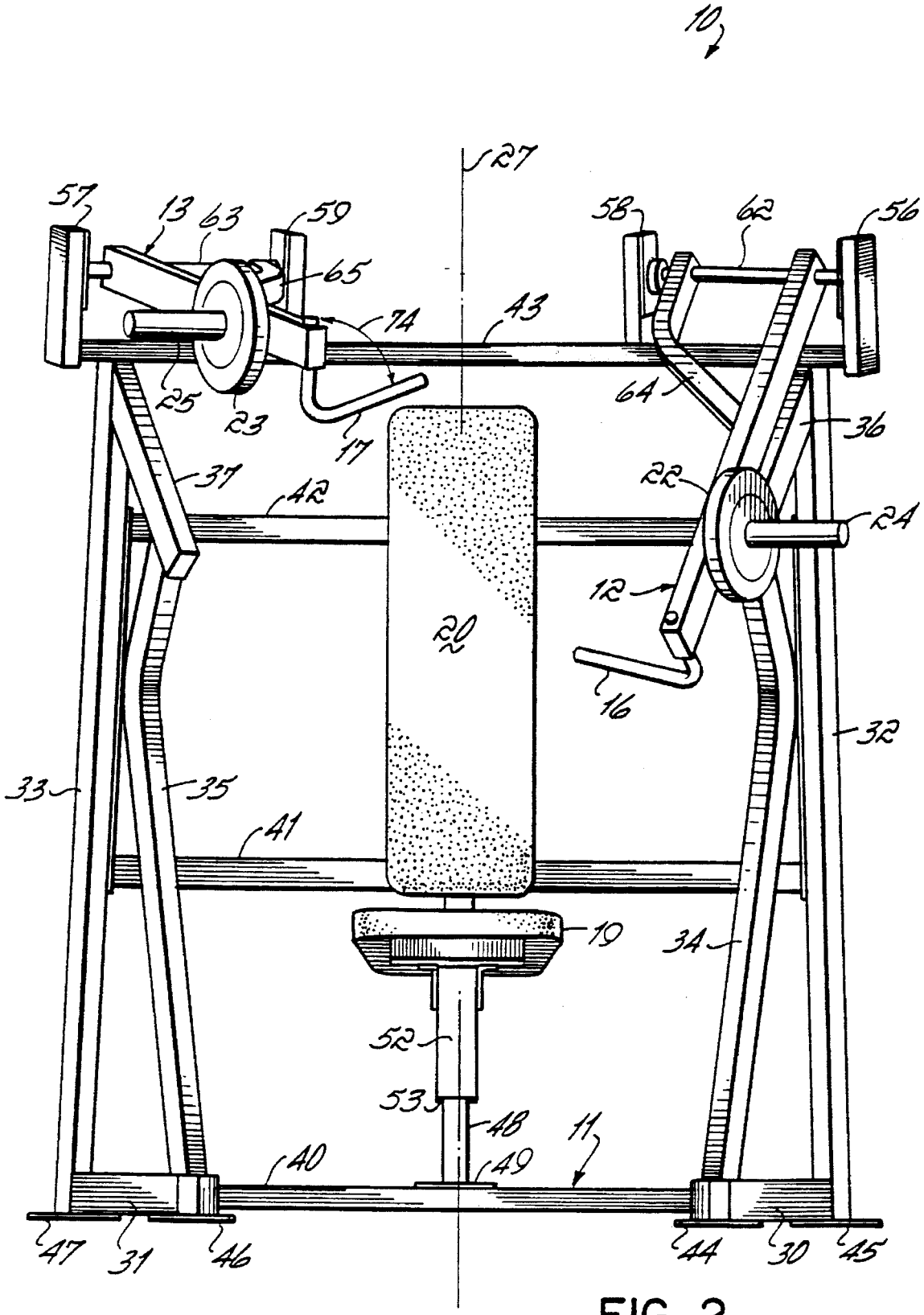
FIG. 2 is a front view of the incline press exercise machine shown in FIG. 1.

FIGS. 1–4 show an incline press exercise machine 10 in accordance with a preferred embodiment of the invention. This machine 10 includes a frame 11 made of a number of straight and/or curved sections of heavy duty steel that are either welded or bolted together, or pivotally connected. Exercise levers 12 and 13 are pivotally connected to the frame 11 at their upper rearward ends. Handles 16 and 17 connect to the lower forward ends of levers 12 and 13, respectively. The handles 16 and 17 are adapted to be grasped by an exerciser supported in a declined position on a seat. The seat includes a decline bottom rest 19 and declined back rest 20. By simultaneous upward extension and adduction of the arms in an incline press motion, the exerciser pivots the levers 12 and 13 against the weight resistance provided by removable weight plates 22 and 23 supported on hubs 24 and 25, respectively.

Figure 3:
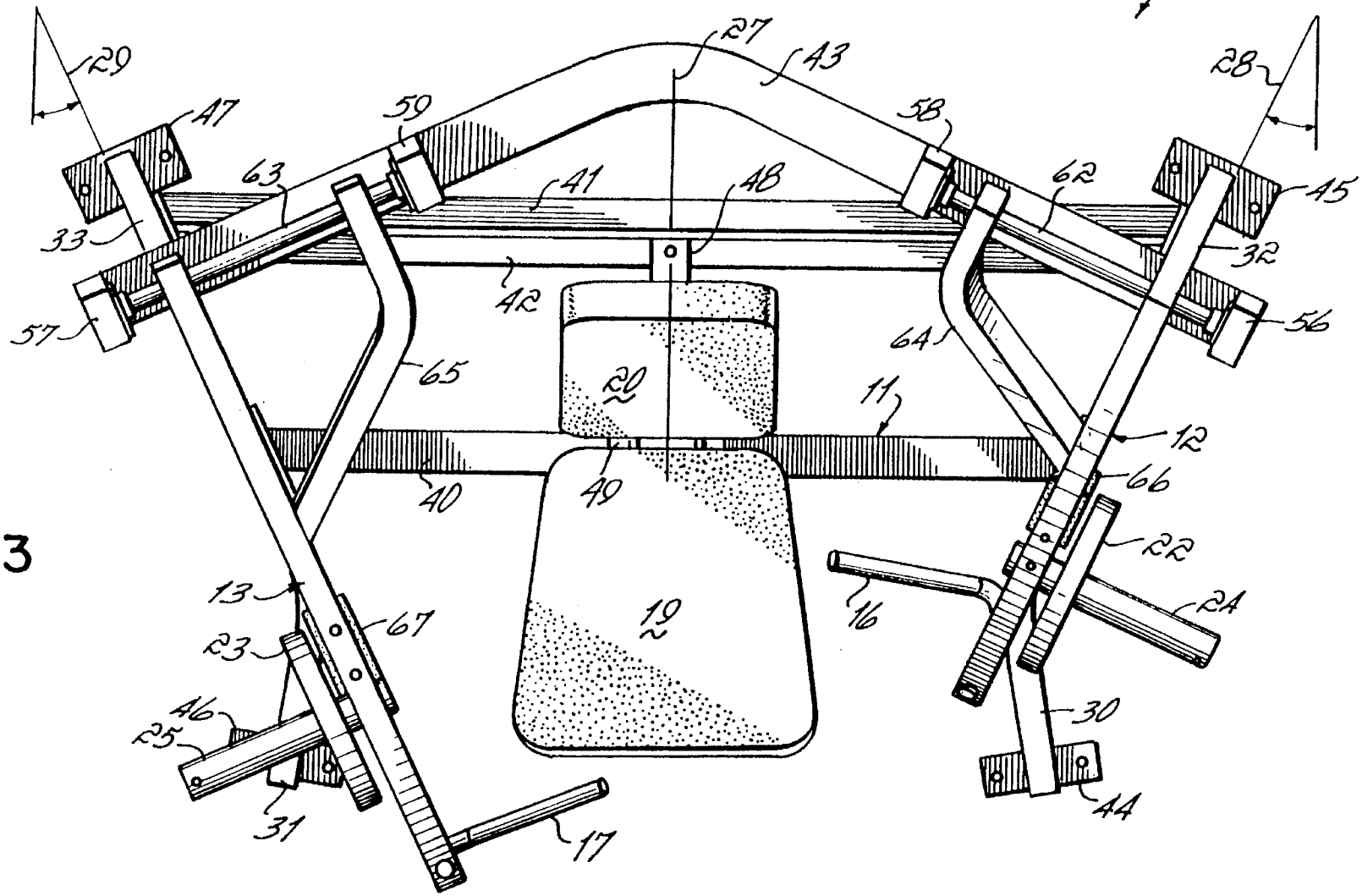
FIG. 3 is a plan view of the incline press exercise machine shown in FIG. 1.

The bottom rest 19 and back rest 20 are bisected by a vertical midplane 27 (shown an FIG. 3) that extends through the middle of the frame 11. The frame 11 has two sides that are mirror images with respect to vertical midplane 27. Each side has a bottom support, a rear leg, a front leg and a top support. On the left side of the frame 11, as viewed by an exerciser supported on bottom rest 19 and back rest 20, these parts are numbered 30, 32, 34 and 36. Similarly, on the right side of frame 11 these parts are numbered 31, 33, 35 and 37, respectively. The two sides of the frame 11 are connected by bottom brace 40, lower intermediate brace 41, upper intermediate brace 42 and top brace 43. Top brace 43 has a central bend to accommodate the forward convergence of the sides of the frame 11. The components of the left and right sides of the frame 11 form forwardly converging planes which are designated by numerals 28 and 29, respectively. Each of the planes 28 and 29 preferably converges toward midplane 27 at an angle of about 25°, as best shown in FIG. 3. Each of the metal sections forming the sides are preferably connected together by welds. The braces are connected to the sides by either welds or bolts extended through welded on end plates. The frame 11 is supported at its corners by welded bottom plates 44, 45, 46 and 47 (see FIG. 3 for plate 47). Preferably, the bottom plates have bolt holes for optional securement of the machine 10 to a portable base.

Figure 4:
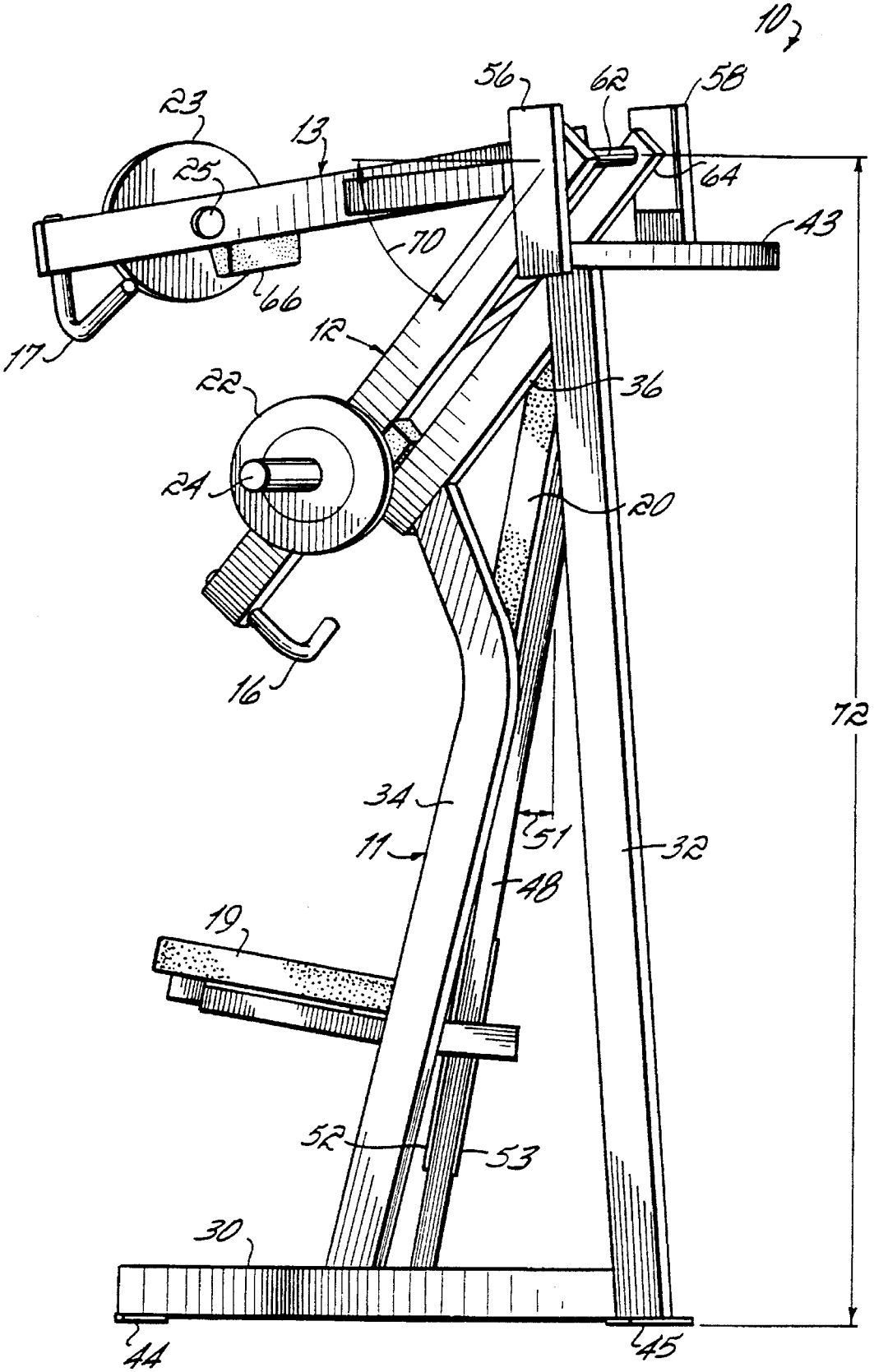
FIG. 4 is a side view of the incline press exercise machine shown in FIG. 1.

Bottom rest 19 and back rest 20 are connected to a central leg 48 that extends along vertical midplane 27. Central leg 48 has an end plate 49 welded at its bottom end, which is in turn secured to bottom brace 40. The top of center leg 48 is supported by upper intermediate brace 42 at an angle designated by numeral 51, as shown in FIG. 4. Preferably, this angle is about 10° so that the seat declines rearwardly from vertical by about 10°. Bottom rest 19 extends perpendicularly from back rest 20, so that bottom rest 19 declines rearwardly from horizontal by about 10°.

The bottom rest 19 is preferably adjustable upwardly or downwardly along leg 48. Adjustment is provided by frictional engagement between parallel spaced bars (not shown) connected to bottom rest 19 and two planar pieces 52 and 53 that are secured to central leg 48 in a sandwiching arrangement. To raise or lower the bottom rest 19, a forward end thereof is tilted rearwardly, or upwardly with respect to central leg 48, so that the spaced parallel bars move away from, or provide clearance from pieces 52 and 53. In this orientation, the bottom rest 19 may be moved upwardly or downwardly along the planar pieces, parallel to leg 48. When the forward end is subsequently tilted downwardly, the parallel bars will frictionally engage pieces 52 and 53. Any number of other methods for providing adjustability for bottom rest 19 along leg 48 would be equally suitable.

Uprights 56 and 58 on one side of the frame 11 and uprights 57 and 59 on the opposite side of the frame 11 are welded in spaced relation to the top of top brace 43. These uprights define the locations of axles 62 and 63 to which levers 12 and 13 are connected, respectively. The axles 62 and 63 are connected to frame 11 by bearings. A pillow block bearing sold by Browning, Part No. VF 2S 116 has proved suitable. These bearings require maintenance only once a year, maintenance which consists of one shot of lubricating oil. For additional strength and stability, levers 12 and 13 include diagonal stabilizing braces 64 and 65, respectively. Rubber stops 66 and 67 are mounted to the bottoms of levers 12 and 13, respectively, to limit downward pivotal movement and to establish the desired initial angle for commencing an incline press exercise.

Each lever 12 or 13 preferably has a length of about 36¼", and is oriented downwardly at an initial angle designated by numeral 70 in FIG. 4. Preferably, this initial angle is about 50°. The hubs 24 and 25 are connected at a predetermined distance between the top and bottom ends of the levers 12 and 13, respectively, preferably about 24½" from the top ends thereof. The distance from the ground to the center of the axle 62 is designated by numeral 72, and this distance is preferably about 68⅔".

Each handle 16 or 17 is preferably a bent metal member with one end inserted and welded in place within an opening in a lower end of a respective lever. The angle between the two ends of each handle is designated by numeral 74, (FIG. 2), and is preferably about 70°. The free end of each handle is oriented at a 90° angle from the respective lever. This places the handles at a 25° inward tilt, toward the exerciser. The bend in the handles also provides about a 20° upward extension, from the perspective of an exerciser supported on the seat. The angles of the handles couple natural grasping positions for the hands to the converging planes of lever movement, thereby enabling the motive force of an incline press to be applied in a manner which naturally accommodates the musculoskeletal structure of a human being.

As mentioned previously, frame 11 enables a person to perform an incline press exercise, either simultaneously with both arms or independently, a feature which is particularly desirable for rehabilitation.

For this embodiment, the moment arm about the pivot point through the duration of the pressing maneuver is related to the sine of the angle of the lever with respect to vertical. Initially, this angle is 40°, or the complement of initial angle 70. As this complement angle approaches 90°, the exercise becomes increasingly difficult. Past 90°, the moment arm again decreases. However, most persons are neither tail enough nor have long enough arms to move the lever past this 90° position. This invention provides an incline press exercise machine that couples a varying moment arm to an incline pressing exercise performed from a declined, seated position, with the moment arm varying according to the first quarter of a sine wave for most persons.

As such, this machine 10 provides a moment arm increase that substantially matches the physical strength curve for an incline press maneuver. This is true because, as the arms of a person are upwardly extended and adducted towards the "lock out" position, the physical resistance capabilities increase tremendously. Thus, for most individuals using this machine 10, this increasing physical capability is matched by a sinusoidally increasing moment arm. As a result, the degree of difficulty of the exercise remains relatively constant throughout, and there are no "sticking points."

It is also to be understood that the strength curve for a declined pressing maneuver is related to the angle of push, which is determined by the seat angle and the arm length of the person exercising. For this machine, the angle of push is relatively constant throughout.

While a preferred embodiment of the invention has been described, it is to be understood that the invention is not limited thereby and that in light of the present disclosure, various other alternative embodiments will be apparent to a person skilled in the art. For instance, the structural orientation of some parts or portion of the frame 11 is not critical, so long as the positioning of the lever pivot points, the lever lengths, the handles and the vertical planes of motion are maintained. Additionally, while the particular angles shown are considered to be optimum at this point in time, based upon feedback from those involved in strength training, it is entirely possible that some further refinements may evolve. Accordingly, it is to be understood that changes may be made without departing from the scope of the invention as particularly set forth and claimed.

I claim:

1. An incline press exercise machine comprising:

a frame;

a seat connected to the frame and adapted to support a person in a declined seated position straddling a vertical midplane;

a lever having an upper rearward end connected to the frame for pivotal movement about an axis located above the seat and along an outer vertical plane that converges toward said vertical midplane, the lever also having a lower, forward end adapted to hold a removable weight; and a handle connected to the lower end of the lever and adapted to be grasped and upwardly extended and adducted in an incline press motion by an exerciser supported on said seat, thereby to pivot the lever through the outer vertical plane.

2. The incline press exercise machine of claim I and further comprising:

a second lever pivotally connected to the frame, the second lever being a mirror image of the first lever with respect to the vertical midplane.

3. The incline press exercise machine of claim wherein said handle extends rearwardly and then upwardly from the lower forward end of the lever.

4. The incline press exercise machine of claim 1 and further comprising:

stop means connected to said lever for coacting with said frame to limit downward pivotal movement with respect to the frame.

5. The incline press exercise machine of claim 1 wherein said outer vertical plane converges toward said vertical midplane at an angle of about 25°.

6. The incline press exercise machine of claim 1 wherein an initial starting position of lever is oriented at an angle of about 50° from horizontal.

7. The incline press exercise machine of claim 3 wherein said handle further comprises:

a generally U-shaped member with one end thereof fixedly mounted to the lower end of the lever and a free end thereof adapted to be grasped by the exerciser, the member ends forming an angle of about 70° therebetween and the free end rotated inwardly from the lever at an angle of about 90°.

8. The incline press exercise machine of claim 1 wherein said seat includes a back rest declined from said frame at an angle of about 10° from vertical.

9. An incline press exercise machine comprising: a frame;

a seat connected to the frame and adapted to support a person in a declined seated position straddling a vertical midplane;

two levers, each lever connected to the frame at an upper rearward end thereof and pivotal through an outer vertical plane that converges toward the vertical midplane, each lever also having a lower forward end adapted to hold a removable weight; and two handles, each handle connected to a lower forward end of a lever and adapted to be grasped and upwardly extended and adducted in an incline press motion by an exerciser supported on the seat, whereby said extension and adduction pivots the levers along the respective outer vertical planes against a predetermined weight resistance provided by the removable weights held at said lower, forward ends, the levers being independently pivotal to provide simultaneous and/or independent incline press exercise along said converging planes.

10. The incline press exercise machine of claim 9 wherein the axes of pivotal motion of the levers are located above and behind the seat.

11. The incline press exercise machine of claim 9 wherein each said lever has an initial, at rest position oriented downwardly at an angle of about 50° from horizontal.

12. The incline press exercise machine of claim 9 wherein each said handle extends rearwardly and then upwardly from the lower forward end of the respective lever.

13. The incline press exercise machine of claim 9 wherein each said handle further comprises:

a generally U-shaped member with one end thereof fixedly mounted to the respective lever lower end and a free end thereof adapted to be grasped by the exerciser, the member ends forming an angle of about 70° therebetween and the free end rotated inwardly from the lever at an angle of about 90°.

14. The incline press exercise machine of claim 9 wherein each outer vertical plane is oriented at an angle of about 25° with respect to the central vertical plane.

15. The incline press exercise machine of claim 9 wherein each lever further comprises:

stop means for coacting with the frame to limit downward pivotal motion of said lower forward end.

16. The incline press exercise machine of claim 9 wherein said seat includes a back rest declined from said frame at an angle of about 10° from vertical.

17. An incline press exercise machine comprising:

a frame having a front facing direction along a vertical midplane;

a seat connected to the frame and adapted to support an exerciser in declined position looking outwardly from the front of the frame; and incline press exercise means pivotally connected to the frame for providing, for a person supported in a declined position on the seat, exercise via an extended upward and adductive incline pressing motion against a selectable weight resistance, the incline pressing motion producing movement along a vertical plane that converges forwardly with respect to the front of the frame, thereby to exercise and incline group which includes the pectoral muscle, the tricep and the deltoid, the incline press exercise means including a lever with an upper rearward and connected to the frame, the lever spaced laterally from the midplane.

18. The exercise machine of claim 17 wherein each said vertical plane converges at an angle of about 25°.

*19. An incline press exercise machine comprising:*

*a frame adapted to locate an exerciser in an exercise position straddling a vertical midplane;*

*a lever having an upper rearward end connected to the frame for pivotal movement about an axis located above the exercise position and along an outer vertical plane that converges toward said vertical midplane, the lever also having a lower forward end adapted to hold a removable weight; and*

*a handle connected to the lower end of the lever and adapted to be grasped and upwardly extended and adducted in an incline press motion by an exerciser located in the exercise position, thereby to pivot the lever through the outer vertical plane.*

*20. An incline press exercise machine comprising:.*

*a frame adapted to define an exercise position for an exerciser, whereby the exerciser in the exercise position is straddling a vertical midplane;*

*two levers, each lever connected to the frame at an upper rearward end thereof and pivotal through an outer vertical plane that converges toward the vertical midplane, each lever also having a lower forward end adapted to hold a removable weight; and*

*two handles, each handle connected to a lower forward end of a lever and adapted to be grasped and upwardly extended and adducted in an incline press motion by an exerciser located in the exercise position, whereby said extension and adduction pivots the levers along the respective outer vertical planes against a predetermined weight resistance provided by the removable weights held at said lower forward ends, the levers being independently pivotal to provide simultaneous and/or independent incline press exercise along said converging planes.*

*21. An incline press exercise machine comprising:*

*a frame having a front facing direction along a vertical midplane, the frame defining for an exerciser an exercise position looking outwardly from the front of the frame along the vertical midplane; and*

*incline press exercise means pivotally connected to the frame for providing, for an exerciser located in the exercise position, exercise via an extended upward and*

*adductive incline pressing motion against a selectable weight resistance, the incline pressing motion producing movement along a vertical plane that converges forwardly with respect to the front of the frame, thereby to exercise an incline muscle group which includes the pectoral muscle, the tricep and the deltoid, the incline press exercise means including a lever with an upper rearward end connected to the frame, the lever spaced laterally from the midplane.*

* * * * *

UNITED STATES PATENT AND TRADEMARK OFFICE

CERTIFICATE OF CORRECTION

PATENT NO. : RE 35,470
DATED : March 4, 1997
INVENTOR(S) : Gary A. Jones

It is certified that error appears in the above-indentified patent and that said Letters Patent is hereby corrected as shown below:

At column 4, line 41, "(shown an FIG.3)" should be --(shown in FIG.3)--.

At column 6, line 6, "tail enough" should be --tall enough--.

At column 6, line 1 of claim 3, "claim" should be --claim 1--.

At column 7, line 2 of claim 6, "position of lever" should be --position of said lever--.

At column 8, line 17, "exercise and incline" should be --exercise an incline--.

At column 8, line 20, "rearward and" should be --rearward end--.

Signed and Sealed this

Twenty-ninth Day of July, 1997

Bruce Lehman

*Attest:*

BRUCE LEHMAN

*Attesting Officer*

*Commissioner of Patents and Trademarks*